United States Patent
Detrick et al.

(10) Patent No.: US 6,338,746 B1
(45) Date of Patent: Jan. 15, 2002

(54) POLYMER-SULFUR-POLYMER COATED FERTILIZERS

(75) Inventors: John H. Detrick; Garrard L. Hargrove, both of Birmingham, AL (US)

(73) Assignee: RLC Technologies, L.L.C., Sylacauga, AL (US)

( * ) Notice: Subject to any disclaimer, the term of this patent is extended or adjusted under 35 U.S.C. 154(b) by 0 days.

(21) Appl. No.: 09/359,036

(22) Filed: Jul. 23, 1999

(51) Int. Cl.⁷ .............................. C05C 9/00; C05G 5/00
(52) U.S. Cl. ........................................... 71/28; 71/64.07
(58) Field of Search .................. 71/28, 64.07, 64.11, 71/64.13, 64.02

(56) References Cited

U.S. PATENT DOCUMENTS

| | | | | |
|---|---|---|---|---|
| 3,223,518 A | * | 12/1965 | Hansen | 71/64 |
| 3,295,950 A | * | 1/1967 | Blouin et al. | 71/64 |
| 3,576,613 A | | 4/1971 | Fleming | |
| 4,042,366 A | | 8/1977 | Fersch et al. | |
| 4,711,659 A | * | 12/1987 | Moore | 71/93 |
| 4,804,403 A | * | 2/1989 | Moore | 71/28 |
| 4,857,098 A | | 8/1989 | Shirley, Jr. | |
| 5,219,465 A | | 6/1993 | Goertz et al. | |
| 5,374,292 A | * | 12/1994 | Detrick et al. | 71/28 |
| 5,538,531 A | * | 7/1996 | Hudson et al. | 71/28 |
| 5,547,486 A | * | 8/1996 | Detrick et al. | 71/28 |
| 5,599,374 A | * | 2/1997 | Detrick | 71/28 |
| 6,152,981 A | * | 11/2000 | Markusch et al. | 71/64.01 |
| 6,231,633 B1 | * | 5/2001 | Hirano et al. | 71/28 |

FOREIGN PATENT DOCUMENTS

DE      40 29 955      3/1992

* cited by examiner

*Primary Examiner*—Wayne Langel
(74) *Attorney, Agent, or Firm*—Breiner & Breiner, L.L.C.

(57) ABSTRACT

The present invention described a polymer coated fertilizer, such as urea, subsequently coated with a layer of sulfur and thereafter a further coating of polymer. Preferably, the polymer coatings are formed by the direct in situ co-polymerization of the components of the polymer on the fertilizer and on the sulfur coating. The compositions provide positive controlled release characteristics, are abrasion and impact resistant and are substantially more economical to produce than polymer coated fertilizers.

10 Claims, 1 Drawing Sheet

POLYMER-SULFUR-POLYMER COATED FERTILIZERS

FIELD OF INVENTION

This invention relates to controlled release fertilizers. More particularly, the invention relates to controlled release fertilizers comprising a nutrient, such as urea, coated with a polymer layer, sulfur layer and polymer layer in that order. The fertilizers have good impact and abrasion resistance, undergo controlled release and are manufactured at low cost.

BACKGROUND OF INVENTION

Slow release or controlled release fertilizers have received substantial attention in the marketplace, particularly for turfgrasses and ornamental plants grown in nurseries. The commercial controlled release fertilizers are of various types. Thus, sulfur-coated urea (SCU) as slow release fertilizers are well known. In the customary process for the production of sulfur-coated urea, granular urea of nominal size range, 1.7–2.9 mm, which has been preheated to about 160° F. to about 180° F., is introduced into the front end of a rotating horizontal cylindrical drum, nominally 12 feet in length and 5½ feet in diameter. Lifting flights, or longitudinal ledges, which are fastened to the inside wall of the drum and evenly spaced around its circumference, lift and cascade the urea granules as the drum rotates. As the cascading granules pass through the drum, molten (290° F.) sulfur is sprayed onto the urea granules from a series of nozzles uniformly positioned within the length of the drum. When a droplet of molten sulfur contacts a granule, it quickly solidifies; and a continuous coating of sulfur is formed on a urea granule when a sufficient number of molten sulfur droplets have made contact with the granule. In this randomized coating process the granules are coated to an average target thickness of, for example, 40 microns ($\mu$) or about 13%–14% by weight sulfur-coating on the urea. However, because of the random distribution of sulfur droplets contacting the granules, the SCU granules which are discharging from the drum, have thin ($<30\mu$), medium ($30\mu$–$50\mu$) and thick ($>50\mu$) sulfur-coating thicknesses.

Because of the inherent brittleness of the crystalline solid sulfur-coating which forms on the granule, and the thin, or even noncontinuous coating on many of the granules, it is essential that some type of secondary outer coating or sealant be spray applied onto the sulfur-coated surface. Usually this is done in a second horizontal rotating drum in series with the sulfur-coating drum. This sealant conventionally is either a polymeric hydrocarbon, petroleum-based wax, or a combination of high viscosity polymeric paraffinic oil plus polyethylene, which is spray applied as a hot melt liquid onto the hot, but solidified sulfur-coating surface. Since the sealant melt will not solidify at the 160°–180° F. temperature of the sulfur-coated urea granules onto which it is applied, the liquid sealant distributes relatively uniformly onto all sulfur-coated granules, transferring by flowing from one granule to the next as they cascade through the rotating secondary sealant coating drum. These sealant coated sulfur-coated urea granules pass through a fluid bed cooler, after they are discharged from the sealant drum, wherein the sealant solidifies to a firm, but somewhat tacky coating. Although these sulfur coated fertilizers have received substantial uses, there are problems from the standpoint of obtaining uniform coating thicknesses, predictable release characteristics resulting from cracks in the sulfur coatings, essential abrasion and impact resistance, and the complexity of the processing steps necessary as above defined.

More recently, because of problems associated with sulfur coated fertilizers, such as above defined, polymer coated fertilizers have received substantial attention, particularly in view of the better controlled release properties obtained with certain polymer coated fertilizers. Thus, controlled release fertilizer particles which have remarkably high resistance to attrition, uniform release characteristics, and a method for their preparation are disclosed in Moore, U.S. Pat. Nos. 4,711,659 and 4,804,403. According to those patents, controlled release fertilizer particles are obtained by reacting a water-soluble central mass of plant food compound containing reactive functional groups, such as the $NH_2$ groups of urea, in particulate form, with a chemical coupling agent followed by reaction with a coating material, such as a polyol, to provide a water-insoluble polymer coating or sealing layer on the plant nutrient. The plant nutrient and sealing layer are chemically bonded to each other through the coupling agent. Specifically, the coupling agent reacts with and connects itself to functional group on a water-soluble central mass of plant nutrient to form generally a base coating having additional reactive groups. A water-insoluble coating or sealing layer then is bonded to the base coating through its reaction with the additional reactive groups on the base coat. Thereafter, multiple reacted layers of alternate applications of coupling agent and sealing layer are formed to provide a coating having a desired thickness. The coated fertilizer particles are highly resistant to attrition even under extreme vibration, impact and abrasion and have controlled release.

Although polymer coated fertilizers as above described have received substantial attention, and have been found to have many applications, they are expensive. Accordingly, in an effort to reduce the cost of controlled release fertilizers, fertilizers have been manufactured comprising a combination of sulfur and polymer coatings. Thus, U.S. Pat. No. 5,599,374 describes a fertilizer composition wherein a sulfur coating is applied to a nutrient, such as urea, and thereafter a polymer coating is applied over the sulfur. These compositions have good release characteristics and resistance to impact in comparison to sulfur coated fertilizers. However, such coatings are not completely acceptable for many applications and, additionally, are still substantially costly.

The present invention, therefore, is directed to controlled release fertilizers which have good release characteristics over prolonged periods of time but yet are cost effective, allowing their use in many applications including nursery ornamental and agricultural markets.

SUMMARY OF INVENTION

The present invention is directed to the discovery that it is possible to apply a uniform and continuous coating of sulfur over a polymer coated nutrient granule, such as urea, without detriment to the polymer coating and then applying a second polymer coating over the sulfur in a continuous application. Surprisingly, as will be developed hereinafter, the resultant granule is cost effective, in that the sulfur is relatively cheap compared to a polymer coating, permitting the build up of a coating thickness having the essential controlled release as well as good resistance to abrasion and impact.

Thus, as is recognized in the art, a controlled release, or timed release fertilizer as the terms are used herein, is effected by a coating such as sulfur or a polymer membrane encapsulating a fertilizer granule. The duration of release resulting from the encapsulated granule can be controlled by the thickness of the coating applied to the fertilizer granule, with thicker coatings providing longer duration of timed release. When a relatively thick polymer membrane coating is applied to the fertilizer particle, in order to achieve the desired controlled release duration, this results in a high weight percentage of coating relative to the weight percentage of encapsulated fertilizer. The result is a high cost coated product relative to the cost of the uncoated fertilizer product. Typically, polymers used in encapsulation are 20× to 30× the cost of the fertilizer which they encapsulate. Therefore, a fertilizer, with its cost indexed at 100, and a polymer, with a cost index of 2500, would result in a materials cost for the polymer-coated fertilizer (PCF) as shown below.

For example, if a 12% by weight, relatively thick polymer coating is used, this PCF would have a materials cost as follows:

| Component | Cost Index | Wt. % | Materials Cost |
|---|---|---|---|
| Fertilizer granule | 100 | 88 | 88 |
| Polymer coating | 2500 | 12 | 300 |
| PCF | | 100 | 388 |

Attempts to reduce polymer cost by the use of low-cost fillers, such as powdered limestone or clay, have had slight success, since the amount of fillers which can be added is limited, usually up to about 25% of the total coating applied. Assuming the filler material has a cost index one-half the fertilizer cost index, and that the filler is 25% of the total coating, the materials cost of the PCF with a 12% total coating becomes:

| Component | Cost Index | Wt. % | Materials Cost |
|---|---|---|---|
| Fertilizer granule | 100 | 88 | 88 |
| Polymer coating | 2500 | 9 | 225 |
| Filler (in coating) | 50 | 3 | 2 |
| PCF | | 100 | 315 |

While this 315 cost index represents a 23% cost reduction from the 388 cost index of the pure polymer coating, it is still over 3× more costly than the uncoated fertilizer cost index of 100.

As a cost lowering alternative to incorporating powdered fillers into the polymer coating material that is applied to the fertilizer granule substrate, it was discovered that sulfur can be included at much higher percentages within the polymer coating when incorporated as separately applied composite layer between a relatively thin inner layer and outer layer of polymer. The result is a dramatic reduction in the materials cost of the PCF without a significant change in the release duration afforded by the pure polymer coating of the same applied weight percentage.

Further, it was determined that when molten sulfur was used as the composite filler layer, it could be used for this purpose, uniquely, only when the polymer coating of the polymer-coated fertilizer substrate was not physically altered at the temperature required for the application, including but limited to the application temperature of the molten sulfur, usually between 270° F. and 300° F. Many polymer coatings in use today are thermoplastics, which are applied to the fertilizer granule as solvent, water based or hot melt systems, and physically will not withstand a coating application of high temperature molten sulfur.

The thermoset polymer coating, which is formed on the fertilizer granule by the in situ polymerization reaction described in U.S. Pat. Nos. 4,711,659, 4,804,403, 5,374,292, is not adversely affected by high temperatures. Further, because they are continuous polymerization reaction coating systems, which copolymerize monomer liquids that do not include solvents, they lend themselves to application of composite coatings in sequence in a series of processing steps. In the first step in a three-step series of sequential processing operations, the reaction polymer coating is applied to the fertilizer substrate. Then, in sequence, this step is followed by the molten sulfur application to the thermoset polymer surface of the PCF, and, in turn, is followed by a second polymerization reaction coating system applied to the sulfur surface of the now sulfur coated-polymer coated fertilizer substrate.

Release characteristics of polymer coated-sulfur coated-polymer coated urea fertilizers and of polymer (only)-coated urea fertilizers are compared in Table I below:

TABLE I

| Products at Nominal 2.4 mm Diameter | % Coating Components | | | % Total | Release @ 30° C. Weeks |
|---|---|---|---|---|---|
| | Polymer | Sulfur | Polymer | | |
| PC-Urea | 4 | — | — | 4 | 4–6 |
| PC-Urea | 12 | — | — | 12 | 12–18 |
| SC-Urea | — | 12 | — | 12 | 2 |
| PC-SC-Urea | — | 10 | 2 | 12 | 6 |
| PC-SC-PC-Urea | 2 | 8 | 2 | 12 | 14–16 |

As can be seen from the data in Table I, for the same 12% total coating the polymer-sulfur-polymer composite coating provides comparable release duration as the polymer (only)-coated urea for significantly less percent polymer in the composite. When a polymer (only) coating is applied to the same percentage as the total polymer used in the polymer-sulfur-polymer composite, its release duration is much shorter. The compositing of sulfur, therefore, represents considerable extension of release duration at much lower coating materials cost. As shown in Table II, when the sulfur is 67% of the total coating, the materials cost of the composite coated fertilizer (PSPCF) is 50% below the cost of the polymer (only) coated fertilizer (PCF) and less than 2× the cost of the uncoated fertilizer.

TABLE II

| | Cost Index | % | Materials Cost |
|---|---|---|---|
| PCF Component | | | |
| Fertilizer | 100 | 88 | 88 |
| Polymer | 2500 | 12 | 300 |
| PCF | | 100 | 388 |
| PSPCF Component | | | |
| Fertilizer | 100 | 88 | 88 |
| Polymer | 2500 | 2 | 50 |
| Sulfur | 50 | 8 | 4 |
| Polymer | 2500 | 2 | 50 |
| PC-SC-PCF | | 100 | 192 |

The cost advantage obtained by using a layer of sulfur in a composite polymer coated-sulfur coated-polymer coated controlled release fertilizer permits the use of the controlled release fertilizer in applications where controlled release products were conventionally used, such as turfgrasses and nursery applications but in addition, permits the use of the controlled release fertilizer in applications where larger amounts of fertilizer are used, such as in the fertilization of agricultural crops such as wheat, cotton and the like.

Having described the invention in general terms, the following will be a detailed description and preferred embodiment of the invention.

GENERAL DESCRIPTION AND PREFERRED EMBODIMENT

Figure 1:
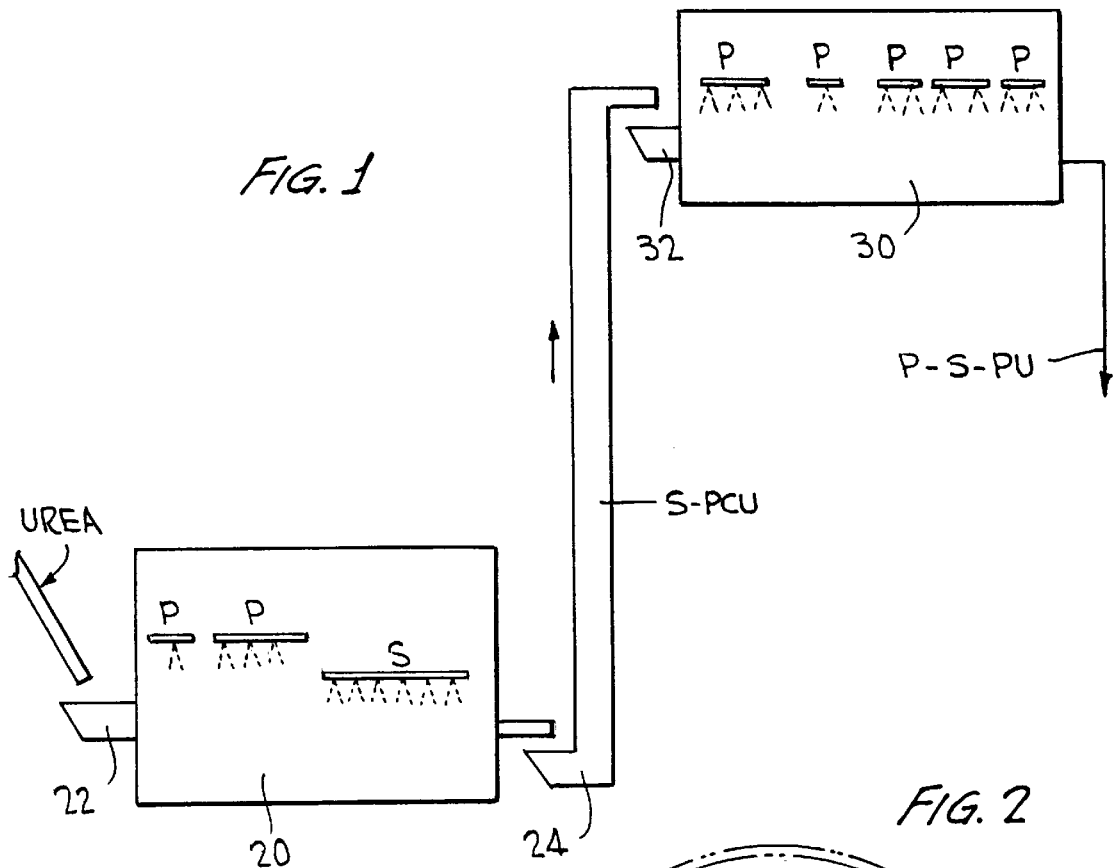
FIG. 1 is a schematic illustration of a coating system showing a method of forming the granules of the present invention.

Referring to FIG. 1, the machine system comprises a first rotating drum 20 where a uniform coating of polymer (P) and a uniform coating of sulfur (S) is applied to urea granules in a continuous operation. Thus, urea granules are fed from a storage area, not shown, onto a conveyor 22 and fed into rotating drum 20. Rotating drum 20 is preferably about six feet in diameter and about twelve feet long. In the rotating drum 20, the urea granules, which are in the nominal size range 1.7 to 2.9 mm and have been preheated to about 170° F., in the first section are coated separately with polymeric MDI (4,4 diphenylmethane diisocyanate), TEA (triethanolamine) and DEG (diethylene glycol) polyols. The polymer components polymerize on the urea granules to form a polymer coating.

In a continuous process, the polymer coated granules are then brought into contact with molten sulfur (290° F.) which is sprayed onto the polymer coated urea. Since the polymer is thermoset, the polymer coating is not detrimentally affected by the heat of the molten sulfur. The molten sulfur thus contacts the polymer coated urea to form a solid sulfur layer over the polymer coating. The sulfur coated-polymer coated urea SC-PCY is withdrawn from drum 20 onto a conveyor 24 and fed to conveyor 32 leading into a second rotating drum 30, approximately the same size as drum 20. In drum 30, polymer components are applied through spray nozzles, as in drum 20, onto the sulfur coated-polymer coated urea to provide a urea granule having first a polymer coating, a sulfur layer and then a second polymer coating.

Figure 2:
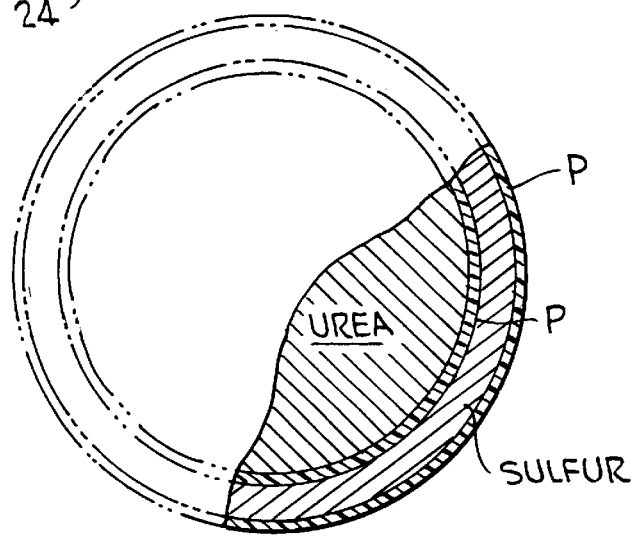
FIG. 2 is a cross-sectional view of a urea granule having coatings in accordance with the present invention.

In FIG. 2, a granule of coated urea as made in FIG. 1 is diagramatically illustrated. The urea granule has a first coating of polymer P followed by a layer of sulfur, S, and then by a second layer of polymer P. In accordance with the invention, the first polymer coating has a thickness achieved by a weight percentage application in the range of from about 0.5% to 3% based on the total weight of the granule, a sulfur layer in the range of about 4% to 12%, and a second polymer coating in the range of about 1.5% to 4%. Preferably, the second polymer layer will include an application of approximately 0.5% wax. Preferably, the first polymer coating will be of 1.0% to 2.0%.

The present invention has been described primarily with reference to urea as the plant nutrient. As will be apparent to one skilled in the art, however, other nutrients can be utilized in accordance with the present invention. Urea is at times preferred because it has functional reactive groups at the surface of the urea which will react with a diisocyanate when used in forming the first polymer layer. This reaction causes the first polymer layer to be chemically bonded to the urea. However, it is not essential, according to the present invention, that the polymer be bonded to the urea material. Accordingly, other basic fertilizer materials can be utilized, exemplified by but not limited to potassium nitrate, ammonium phosphate, ammonium sulfate or granule mixture of basic fertilizer materials. These materials are intended to be covered by the present invention. Moreover, the invention has been described primarily with reference to the utilization of polymeric MDI as the diisocyanate. However, other poly-functional isocyanates can be utilized as described in U.S. Pat. No. 4,804,403, incorporated herein by reference, include aliphatic, aromatic, and aliphatic aromatic polyisocyanates. These compounds contain two or more -NCO groups available for reaction and as known to one skilled in the art, are widely used in the production of urethane polymers. Moreover, as described in the aforesaid '403 patent, other polyols can be used in addition to the diethylene glycol polyol as set forth in the above preferred embodiment. Moreover, it is not essential that the polymer coating be based on an isocyanate or polyol. The polymer can be virtually any polymer which is thermoset and which can be applied to the plant nutrient without detriment. As previously stated, however, the preferred polymer coatings are those which are formed in situ on the plant nutrient as the fertilizing process is carried forward.

As set forth in the preferred embodiment, the process is carried out in a machine system and process as generally defined in FIG. 1 of this patent. Greater detail of a preferred machine system for forming an in situ polymer on the plant nutrient is described in U.S. Pat. No. 5,547,486, commonly assigned. The disclosure of this patent is incorporated herein by reference.

As will be apparent to one skilled in the art, various modifications can be made within the scope of the aforesaid description. Such modification being within the ability of one skilled in the art form a part of the present invention and are embraced by the appended claims.

It is claimed:

1. A controlled release fertilizer composition comprising a water-soluble central mass of plant nutrient compound in particulate form, a first thermoset polymer coating on said plant nutrient, a layer consisting of elemental sulfur on said first thermoset polymer coating and a second thermoset polymer coating on said layer consisting of elemental sulfur.

2. The composition of claim 1, wherein the plant nutrient compound comprises from about 80% to 95% on a weight basis, the first polymer layer comprises from about 0.5% to 3% on a weight basis, the layer consisting of elemental sulfur comprises from about 4% to 12% on a weight basis and the second polymer coating comprises from about 1.5% to 4% on a weight basis.

3. The composition of claim 2, wherein said first polymer coating comprises from 1.0% to 2% on a weight basis and the second polymer comprises from 1.5% to 3% on a weight basis.

4. The composition of claim 1, 2 or 3, wherein said plant nutrient compound is urea and said first and second polymer are the reaction products of a polyisocyanate and a polyol.

5. The composition of claim 4, wherein said first and second polymer coatings are formed on said plant nutrient in an in situ reaction during the formation of the composition.

6. The composition of claim 5, wherein each of said first and second polymer coatings are a product of polymeric MDI and at least one polyol.

7. A method of forming a controlled release fertilizer composition comprising coating a plant nutrient compound with monomers reactive to form a polymer at a temperature sufficient to form a thermoset polymer and while said polymer is still hot, spraying molten sulfur onto said formed polymer layer to form a sulfur layer and thereafter applying a second thermoset polymer layer to said sulfur layer.

8. The method of claim 7, wherein the monomers are a polyisocyanate and a polyol.

9. The process of claim 8, wherein the plant nutrient compound is urea.

10. The process of claim 7, wherein the first polymer coating comprises from about 0.5% to 3% on a weight basis, the sulfur layer comprises about 4% to 12% on a weight basis and said second polymer coating comprises from about 1.5% to 4% on a weight basis.

* * * * *